(12) United States Patent
Motonaka et al.

(10) Patent No.: US 7,232,108 B2
(45) Date of Patent: Jun. 19, 2007

(54) EXHAUST VALVE FOR A BAG

(75) Inventors: Hiroshi Motonaka, Gobo (JP); Yoshio Shiozaki, Gobo (JP)

(73) Assignee: Taiyo Kagaku Kabushiki Kaisha, Wakayama-ken (JP)

( * ) Notice: Subject to any disclaimer, the term of this patent is extended or adjusted under 35 U.S.C. 154(b) by 68 days.

(21) Appl. No.: 10/848,056

(22) Filed: May 19, 2004

(65) Prior Publication Data

US 2004/0232368 A1 Nov. 25, 2004

(30) Foreign Application Priority Data

May 19, 2003 (JP) ............................. 2003-140075

(51) Int. Cl.
*F16K 1/00* (2006.01)
(52) U.S. Cl. .................... 251/100; 251/82; 383/103
(58) Field of Classification Search ............. 251/100, 251/319, 82; 141/65; 206/524.8; 383/103
See application file for complete search history.

(56) References Cited

U.S. PATENT DOCUMENTS

| 5,332,095 | A | * | 7/1994 | Wu ............................ 206/524.8 |
| 5,931,189 | A | * | 8/1999 | Sweeney et al. ........ 137/512.15 |
| 6,595,486 | B2 | * | 7/2003 | Chen ............................ 251/82 |
| 6,644,510 | B2 | * | 11/2003 | Kawolics et al. ............ 222/105 |
| 6,712,334 | B2 | * | 3/2004 | Motonaka et al. ........ 251/149.6 |
| 2003/0047700 | A1 | * | 3/2003 | Motonaka et al. ........ 251/149.1 |

\* cited by examiner

*Primary Examiner*—Eric Keasel
(74) *Attorney, Agent, or Firm*—Ronald E. Greigg

(57) ABSTRACT

An exhaust valve for a bag comprising a valve body having an exhaust opening communicating with a part between the inner and outer surfaces of the bag, a lid body detachably fitted to the valve body having a suction opening, a valve plate arranged above the upper end of the exhaust opening to move up and open the exhaust opening at the time of exhaust of the bag and to move down and close the opening the exhaust opening after the aeration of the bag, and a lock mechanism for keeping the exhaust opening closed and for allowing the valve plate to move up and down.

2 Claims, 6 Drawing Sheets

EXHAUST VALVE FOR A BAG

BACKGROUND OF THE INVENTION

1. Field of the Invention

This invention relates to an exhaust valve for a bag for compressing its content to be compact. The exhaust valve is fitted to the bag for containing bedclothes such as a comforter, a blanket or the like. The inside of the bag is de-aerated by using a suction nozzle of a vacuum cleaner or the like.

2. Description of the Prior Art

When a comforter, cloths, or the like is stored in a closet or a chest, it is a conventional practice that the comforter or the like are put into a flat bag made of synthetic resin, and the air inside the bag is removed out of the bag by using a vacuum cleaner to compress the content, so that a limited space of storage may be used to store as many comforters, cloths or the like as possible. Compression of the contents like this has been done not only in general homes but also in traders and manufacturers involved in beddings. Further, the bag is also compressed when cloths or the like is packed in a bag when traveling.

When the bag containing a comforter or the like is compressed, it is usual that part of an opening part of the bag is opened by a fastener provided at the opening part of the bag, which is de-aerated by a suction nozzle of the vacuum cleaner inserted into the bag from its opening part. However, when the suction nozzle is directly inserted into the bag, the content of the bag may be sucked into the opening end of the suction nozzle by a suction force of the nozzle. Consequently, not only the content may be damaged but also the suction nozzle is plugged up making de-aeration of the bag difficult and causing a failure of the vacuum cleaner because of the heavy load imposed on its motor.

Therefore, it is known to fit the exhaust valve to the bag in advance, through which the air in the bag is exhausted from outside by using the suction nozzle of the vacuum cleaner to compress the bag, without inserting the suction nozzle into the bag.

The exhaust valve as mentioned above is known from Japanese Patent Publication 2003-34379 for example in which the exhaust valve comprises a valve body provided with an exhaust opening in its center, which exhaust opening connects with the inside of the bag, and a dome-shaped movable lid having a suction opening in its center which suction opening goes through the upper and the lower surfaces of the movable lid. The movable lid is mounted onto the valve body to be freely movable up and down. The exhaust valve further comprises a valve plate for opening and closing the above-mentioned exhaust opening, a spring for keeping the valve plate in close contact with the exhaust opening by pressing the valve plate from the above, and a valve plate operating mechanism for moving the valve plate up to open the valve against the spring force, all of which are positioned inside a chamber formed between the facing surfaces of the movable lid and the valve body. The valve plate is opened by means of the valve plate operating mechanism, which is operated by pressing down the movable lid. With this state, the air inside the bag is exhausted through the suction opening by using the suction nozzle of the vacuum cleaner. After exhausting the air, the valve plate operating mechanism is locked so that it may not move.

However, according to the structure of the exhaust valve as mentioned above, there is a problem that the bag is swollen. Namely, the mechanism for locking the valve plate operating mechanism against movement comprises guide projections mounted onto several parts of the outer periphery of the valve body, and arc-shaped long openings formed in several peripheral parts of the movable lid. The upper ends of the guide projections are inserted into the arc-shaped long openings so that the movable lid may be moved downwardly. The mechanism also comprises engaging projections each of which are mounted to be integrated one with an end of each of the arc-shaped long openings. When the movable lid is turned to a position where each of the engaging projections faces the upper part of each of the guide projections, the engaging projections are received by the guide projections so that the movable lid may be prevented from moving downwardly. Therefore, when excessive load is imposed on the movable lid due to piling up of the bags or the like, the engaging projections are damaged causing failure of locking, the consequence of which is that the movable lid is moved downwardly causing of the bag to swell.

In addition, when the inside of the bag is de-aerated, it is necessary to maintain a state of opening of the valve plate against the spring force by pressing the suction nozzle of the vacuum cleaner against the movable lid. Not only is such an operation troublesome but also it is inconvenient. Moreover, because the spring is formed of metal, it may be rusted and smooth operation may become impossible.

Further, even after the bag is de-aerated completely, the suction force of the vacuum cleaner is applied to the inside of the bag through its suction nozzle, whereby its motor is loaded heavily and a failure of the vacuum cleaner may be caused. To solve the problem, an opening for taking the outside-air is formed in the peripheral part of the movable lid. As mentioned above, the movable lid is formed to be a dome-shape so that the suction nozzle of the vacuum cleaner may be pressed against any part of the movable lid not only in a perpendicular direction but also in an inclined direction. Therefore, when the suction nozzle is moved to slant widely on the movable lid in front, rear, right and left directions, it may depart from the suction opening.

Furthermore, the valve body of the exhaust valve comprises a disc-shaped base plate having an exhaust opening formed in its center, and a valve-positioning member provided with the valve plate for opening and closing the exhaust opening. The base plate and the valve-positioning member are put onto the outside and the inside surfaces of a part of the bag, respectively, in a state that the part of the bag where a vent is formed is sandwiched between them in a unified manner. Consequently, when the exhaust valve is opened and the air inside the bag is suctioned and removed from the vent through the exhaust opening, the suction force is applied intensively to the surface of the content beneath the exhaust opening. Thus the surface is sucked to the exhaust opening by the powerful force. Consequently, not only is a comparatively long time required before finishing de-aeration of the inside of the bag, but also excessive load is imposed on the motor of the vacuum cleaner, causing a failure of the vacuum cleaner.

These problems of the known valve as mentioned above cannot be solved even in such a structure that exhaust air passages of a predetermined height are radially provided to project on the lower surface of the base plate of the valve body from the periphery of the exhaust opening toward the outer peripheral edge of the base plate, because the surface of the content of the bag around the opening of the exhaust air passages comes into close contact with the inner surface of the bag by the suction force coming through the exhaust air passages. When the content has less air permeability such as a down quilt, it is difficult to exhaust the air through the fine weave pattern of the bagging.

To solve the problem, it is so structured that a porous plate having a predetermined thickness is mounted on the lower surface of the base plate outwardly from the outer peripheral surface the base plate to be unified, so that a space as large as the size of the porous plate may be provided between the surface of the content and the inner surface of the bag. However, because each of the pores has a pore wall having a predetermined height corresponding to the thickness of the porous plate and is formed to be an independent vent, which is prevented from communicating with the adjacent pores, suction force cannot be smoothly applied to the vent through the exhaust opening. Consequently, the above problems are not solved completely.

SUMMARY AND ADVANTAGES OF THE INVENTION

This invention is made in view of the abovementioned problems. The purpose of the invention is to provide an exhaust valve structure of a bag, in which a valve plate is easily and surely locked in a state of positive pressing against an exhaust opening after exhausting. It is also the purpose of the invention that even when a suction nozzle of a vacuum cleaner moves to be inclined with respect to the exhaust opening, the suction nozzle keeps communicating with the exhaust opening so that de-aeration of the inside of the bag may be carried out efficiently without imposing heavy load on the vacuum cleaner, and the valve is automatically closed at the same time as the suction force is released. In addition, even when the content of the bag has less air permeability such as a down quilt or the like, the inside of the bag may be de-aerated smoothly.

In order to achieve the abovementioned purposes, the exhaust valve for the bag of this invention has a valve body fitted to the bag by sandwiching or bonding a part of the bag from inner and outer surfaces of the bag with fusion, and a lid body fitted to the valve body to be detachable. The lid body has an under surface and a lower surface facing the valve body. The exhaust opening communicating with an opening going through inner and outer surfaces of the bag is formed in the central part of the valve body. A valve plate, which moves up to open the exhaust opening when the inside of the bag is exhausted and moves down to close the exhaust opening after the de-aeration of the bag, is positioned on the upper end of the exhaust opening. A suction opening through the upper and lower surfaces of the lid body is formed in the central part of the lid body. The lid body is provided with a lock mechanism on its lower surface so that the valve plate may be pressed downwardly to keep the exhaust opening closed when the lid body is turned in a direction around the valve plate and that the valve plate may be allowed to move up and down when the lid body is tuned in the other direction.

The exhaust valve for a bag as structured above includes the locking mechanism comprising a plurality of cam projections mounted to project on the upper surface of the outer peripheral edge of the valve plate at predetermined intervals in the peripheral direction, and engaging projections which are mounted to project on the lower surface of the outer peripheral part of the suction opening in the lid body at predetermined intervals in the peripheral direction thereof. By turning the lid body in one direction, the engaging projections are locked onto the upper end surfaces of the facing cam projections to keep the valve plate in a closed state. By turning the lid body in the opposite direction, the state of locking of the engaging projections onto the facing cam projections is released to allow the valve plate to move up and down.

The exhaust valve comprises a valve body fitted to the bag by sandwiching or bonding a part of the bag from inner and outer surfaces of the bag with fusion, and a lid body fitted to the valve body to be detachable. The exhaust opening communicating with an opening going through inner and outer surfaces of the bag is formed in the center part of the valve body. A valve plate, which moves up to open the exhaust opening when the inside of the bag is exhausted and moves down to close the exhaust opening after the de-aeration of the bag, is positioned on the upper end of the exhaust opening. A suction opening is formed in the central part of the lid body. The lid body is provided with a lock mechanism on its lower surface so that the valve plate may be pressed downwardly to keep the exhaust opening closed by a horizontal forward movement, and the valve plate is allowed to move up and down by its backward movement.

The lock mechanism of the exhaust valve for the bag comprises an operation member, which is movable in reciprocal motion in a horizontal direction and is supported by the lid body to be movable in a back-and-forth motion in a horizontal direction. Cam projections 11 are mounted to project toward either the facing surfaces of the operation member or the valve plate, and the engaging projections on the other surface. When the operation member is moved forward, the cam projections are locked onto the engaging projections to keep the valve plate in a closed state, and when the operation member is moved backward, the state of locking between the cam projections and the engaging projections are released to allow the valve plate to move up and down.

Further, the valve body includes a disc-shaped valve-positioning member having an upper exhaust opening part in its central part and a disc-shaped base plate having a lower exhaust opening part in its central part. The valve-positioning member and the base plate are structured so that they may sandwich or fusion-bond a part of the bag from the inside and the outside surfaces of the bag to be unified. Guide projection pieces of a predetermined height are mounted to project upwardly on the peripheral edge of the upper exhaust opening part of the valve-positioning member fitted to the outer surface of the bag at predetermined intervals in a peripheral direction. Horizontal projections, which are mounted to project radially on several places of the outer peripheral edge of the valve body, are inserted into and engaged with interspaces between the guide projection pieces adjacent to each other so that the valve plate may move in a vertical direction inside a short cylindrical-shaped space surrounded by these guide projection pieces.

Further, the exhaust valve comprises the valve body fitted to the bag by sandwiching or bonding a part of the bag from the inner and the outer surfaces of the bag with fusion, and a lid body which is detachably fitted to the valve body and has a suction opening at its central part. The exhaust opening communicating with the inner and outer surfaces is formed in the central part of the valve body. The exhaust valve also comprises the valve plate which is positioned on the upper end opening part of the exhaust opening and moves up to open the exhaust opening when the inside of the bag is exhausted, and moves down to close the exhaust opening after exhausting. The upper surface of the lid body is formed to be a dome shape, which gently curves downwardly from the suction opening to the outer peripheral edge of the lid body. The restraining projections are mounted to project on the upper surface of the outer peripheral part of the lid body to restrain movement of the suction nozzle. Outside-air intakes are formed in several places around the restraining projections and the suction opening.

The exhaust valve comprises the valve body fitted to the bag by sandwiching or fusion-bonding a part of the bag from the inner and the outer surfaces of the bag, and a lid body which is detachably fitted to the valve body and has a suction opening at its central part. The exhaust opening communicating with the inner and outer surfaces is formed in the central part of the valve body. The exhaust valve also comprises the valve plate which is positioned on the upper end opening part of the exhaust opening and moves up to open the exhaust opening when the inside of the bag is exhausted, and moves down to close the exhaust opening after exhausting. The valve body comprises a disc-shaped valve-positioning member having an upper exhaust opening part at its central part, and a disc-shaped base plate having a lower exhaust opening part at its central part. The valve-positioning member and the base plate sandwich a part of the bag from the inner and the outer surfaces of the bag to be unified together. A plurality of horizontal linear bodies are mounted to project outwardly on the peripheral edge of the lower end opening of the exhaust opening of the lower surface of the base plate so that horizontal passages communicating with the exhaust opening may be formed by the interspaces between the adjacent horizontal linear bodies. Ring-shaped bodies having large and small diameters are concentrically mounted on the upper surface of the horizontal linear bodies projecting outwardly from the base plate so that ring-shaped passages may be formed between the adjacent ring-shaped bodies having large and small diameters.

Instead of using the horizontal air passages and the ring-shaped air passages, a porous plate made of sponge or the like having a predetermined thickness may be mounted to project outwardly on the outer peripheral edge of the base plate.

In operation of the device, after a comforter or the like is put in the bag, the opening part of the bag is closed by means of a fastener. The opening end of the suction nozzle of the vacuum cleaner is pressed against the upper surface of the lid body of the exhaust valve fitted to the bag so that the opening of the suction nozzle may connect with a suction opening formed in the lid body. When the vacuum cleaner is operated under this state, the valve plate moves up to open the exhaust opening, the air inside the bag is exhausted toward the suction nozzle through the exhaust opening by the suction force of the suction nozzle, and the inside of the bag is de-aerated.

When the content of the bag such as a comforter or the like is compressed by de-aeration of the inside of the bag, the pressing force of the suction nozzle against the lid body is released. Then, because the inside of the bag is evacuated, the suction force existing in the bag moves the valve plate down to automatically close the exhaust opening to prevent the outside air from coming into the bag.

After that, when the lid body is turned in a direction around the valve plate, the lock mechanism mounted on the lower surface of the lid body works to directly press the valve plate downwardly to keep the exhausted opening closed. Thus, because the lock mechanism keeps the valve plate in a closed state by a pressing force of the lid body against the valve body, even when the bags containing the compressed contents are piled up, the load of the pile of the bags works to further press the valve plate. Consequently, the valve plate is not released unexpectedly so that the locked state of the valve plate may be surely maintained. In addition, instead of using the lock mechanism, which works by turning the lid body, another type of lock mechanism mounted on the lower surface of the lid body also works similarly. Namely, the valve plate is pressed downwardly by a horizontal forward movement of a member to keep the exhaust opening closed, and the valve plate is allowed to move up and down by its backward movement.

When the content is to be taken out of the bag, the fastener, which fastens the opening part of the bag, is opened. When the bag is reused, the state of closing of the valve plate locked by the lock mechanism is released, and then the bag is de-aerated by using the suction nozzle as mentioned above.

Further, because the upper surface of the lid body is gently curved downwardly from the suction opening formed in the central part of the lid body to the outer peripheral edge thereof to form a dome-shape, exhaust operation may be carried out while the lower end of the opening of the suction nozzle is kept in close and full contact with the upper surface of the lid body not only when the suction nozzle is pressed against the valve body in a vertical direction but also when it is pressed aslant.

Consequently, smooth exhausting operation with good handling performance becomes possible. Not limited to that, because restraining projections for restraining the movement of the suction nozzle is mounted on the outer peripheral part of the upper surface of the lid body, and because outside-air intakes are formed around the restraining projections and the suction opening, substantial movement of the suction nozzle to the outer peripheral side of the lid body is surely prevented by the restraining projections so that the exhausting operation may be carried out while the suction nozzle always and fully communicating with the exhaust opening, and that at least a part of the suction opening may be exposed to the outside of the suction nozzle. Consequently, after the inside of the bag is completely de-aerated, the suction force coming from the suction nozzle may be applied to the outside air and suck the outside air through the inside of the lid body and the suction opening. Therefore, heavy load on the motor of the vacuum cleaner may be prevented.

Further, the valve body comprises a disc-shaped valve-positioning member having an upper exhaust opening part in its central part and a disc-shaped base plate having a lower exhaust opening part in its central part. Because the valve-positioning member and the base plate are structured so that they may sandwich or fusion-bond a part of the bag from the inside and the outside surfaces of the bag to be unified, the valve body may be fitted to a predetermined part of the bag easily and firmly.

Furthermore, on the lower surface of the base plate which is fitted to the inner surface of the bag, a lot of horizontal linear bodies are radially mounted to project from the peripheral edge of the lower end of the exhaust opening in the outward direction of the base plate, so that the interspaces formed between the adjacent horizontal linear bodies may form horizontal air passages which connect with the exhaust opening. On the upper surface of the horizontal linear bodies projecting outwardly from the base plate, ring-shaped linear bodies having large and small diameters are mounted concentrically so that the adjacent ring-shaped linear bodies of large and small diameters may form ring-shaped air passages. The horizontal linear passages and the ring-shaped passages intervene between the inner surface of the bag and the surface of the content of the bag so that the suction force coming from the suction nozzle existing at the exhaust opening may work to suck and exhaust the air inside the content of the bag from the wide surface of the content through the horizontal air passages which are formed radially. Even when the content is a down quilt having less air permeability, efficient de-aeration is possible.

In addition, because the upper surface of the horizontal air passages connects with the other horizontal passages through the ring-shaped air passages, even when a part of the content is sucked into a part of the horizontal air passages by the suction force and close the part of the passages, the suction force existing in the other horizontal passages detours to go above the closed horizontal air passages through the ring-shaped air passages above the horizontal air passages to efficiently exhaust the air inside the bag and smoothly compress the bag without hindering the de-aeration action. Instead of using the horizontal air passages and the ring-shaped air passages, a porous plate made of sponge or non-woven fabric having a predetermined thickness may be mounted to project outwardly on the outer peripheral edge of the base plate to obtain a similar action.

As mentioned hereinbefore, the exhaust valve for the bag of this invention comprises a valve body fitted to the bag by sandwiching or fusion-bonding a part of the bag from the inside and the outside of the bag; a center part of the valve body having an exhaust opening communicating with a part between the inner and the outer surfaces of the bag, a lid body detachably fitted to the valve body; said lid body having a suction opening in the central part thereof, a valve plate arranged above the upper end of the exhaust opening to move up and open the exhaust opening at the time of exhaust of the bag and to move down and close the opening the exhaust opening after the aeration of the bag. Therefore, by applying the suction force to the inside of the valve body from the suction nozzle by pushing the suction nozzle of the vacuum cleaner against the upper surface of the lid body, the valve plate may be released automatically so that de-aeration of the bag may be carried out immediately. After de-aeration, the valve plate may be fitted to the exhaust opening surely and tightly by stopping the operation of the vacuum cleaner.

Further, this invention provides a lock mechanism which is arranged on the lower surface of the lid body to keep the exhaust opening closed by pressing the valve plate downwardly when the lid body is turned in a direction around the valve plate and to allow the valve plate to move up and down when the lid body is turned in another direction. Therefore, it is possible to surely prevent the exhaust opening from opening unexpectedly by means of the lock mechanism after de-aeration of the bag. Further, since the closed state of the valve plate by the lock mechanism is kept by pressing force of the lid body against the valve body, even when the bags housing the content under pressure are piled, the load due to the piled bags functions as a force for pressing the valve plate so that the locking state may be kept surely.

In the exhaust valve for the bag, the structure of the lock mechanism, which comprises a plurality of cam projections mounted to project on the upper surface of the outer peripheral edge of the valve plate at predetermined intervals in the peripheral direction, and engaging projections mounted to project on the outer peripheral part of the suction opening in the lower surface of the lid body; thereby the engaging projections are engaged with the upper end surface of the cam projections by turning operation of the lid body in a direction so as to keep the valve plate closed, and the engaging projections are disengaged with the upper end surface of the cam projections by turning operation of the lid body in another direction so as to allow the valve plate to move up and down. Therefore, it becomes possible to carry the out lock and unlock operations of the valve plate surely and easily so that it may keep the closed state for preventing the air from coming into the bag in a state of lock.

According to one embodiment of the invention the lock mechanism comprises an operation member supported by the lid body to be movable reciprocally in a horizontal direction, a cam projection projected from a facing surface of either the operation member or the valve plate, an engaging projection projected from another facing surface of either the operation member or the valve plate; thereby the valve plate is kept in a closed state by engaging the cam projection with the engaging projection when the operation member is moved forward and the valve plate is allowed to move up and down by releasing the engagement between the cam projection and the engaging projection when the operation member is moved backward. Therefore, it becomes possible to surely prevent the exhaust opening from releasing unexpectedly by means of the lock mechanism after de-aeration of the bag. Further, since the closed state of the valve plate by the lock mechanism is kept by pressing force of the lid body against the valve body, even when the bags housing the content under pressure are piled, the load due to the piled bags functions as a force for pressing the valve plate so that the locking state may be kept surely and the lock and unlock operations of the valve plate may be carried out surely and easily.

The valve body comprises a valve-positioning member of disc shape having an upper exhaust opening part in its central part and a base plate of disc shape so that a part of the bag may be sandwiched or bonded with fusion by the valve-positioning member and the base plate from the inside and the outside of the bag so as to be unified. Therefore, it becomes possible to mount the valve body onto a predetermined part of the bag easily and firmly. Further, guide projections of a predetermined height are mounted to project upwardly on the peripheral edge of the upper exhaust opening part on the upper surface of the valve-positioning member which is fitted to the outer surface of the bag at predetermined intervals in a peripheral direction, and further horizontal projections are mounted to project radially on a plurality of places of the outer peripheral edge of the valve body and inserted into guide spaces between the adjacent guide projections so as to engage with the guide projections so that the valve plate my move in a vertical direction inside a short cylindrical-shaped space surrounding by the guide projections. Therefore, the valve plate may be moved precisely up and down in the short cylindrical space without blindly moving the valve body forward and backward and furthermore it may lock the valve body smoothly without co-rotation with the lid body at the time of lock by the rotational operation of the lid body.

The upper surface of the lid body is formed to be a dome shape which gently curves downwardly from the suction opening to the outer peripheral edge of the lid body. Therefore, even when the suction nozzle of the vacuum cleaner is directed not only to a vertical direction but also to an inclined direction against the valve body, it may carry out de-aeration in a state that the lower end surface of the opening of the suction nozzle is fit to the upper surface of the lid body wholly and as the result it is superior in operation and it may carry out the operation of de-aeration smoothly.

Further, the restraining projections are mounted to project on the upper surface of the outer peripheral part of the lid body to restrain movement of the suction nozzle, and furthermore the outside-air intakes are formed in a plurality of places around the restraining projections and the suction openings. Therefore, it may surely prevent the suction nozzle from moving greatly on the side of the outer periphery of the lid body by means of the restraining projections so that the operation of de-aeration may be carried out in a state that the suction nozzle is always communicating with the exhaust opening. Further, since it is possible to keep at least a part of the suction opening exposed outwardly from the suction nozzle, it is possible to suck the air by affecting the sucking force of the suction nozzle from the lid body to the atmosphere through the suction opening, and as the result it can be possible to prevent the motor from loading greatly.

A plurality of horizontal linear bodies are mounted to project outwardly on the peripheral edge of the lower end opening of the exhaust opening of the lower surface of the base plate so that horizontal passages communicating with the exhaust opening may be formed by the interspaces between the adjacent horizontal linear bodies, and further ring-shaped linear bodies having large and small diameters are concentrically mounted on the upper surface of the horizontal linear bodies projecting outwardly from the base plate so that ring-shaped passages may be formed between the adjacent ring-shaped linear bodies having large and small diameters. Therefore, it is possible to keep a state that the horizontal linear bodies projecting from the base plate are interposed between the inner surface of the bag and the content so as to move the inner surface of the bag away from the content for a wide range. Further, the suction force from the exhaust opening may affect onto the inside of the bag for a wide range through a plurality of horizontal air passages between the adjacent horizontal linear bodies and as the result it may possible to de-aerate the air of the bag smoothly and effectively.

Furthermore, even when a part of the content is sucked and fit into the horizontal air passage to close it by the suction force through the horizontal air passage, since the upper surfaces of the horizontal air passages are communicating with the other horizontal air passage through the ring-shaped passage, it becomes possible to apply the suction generated in the upper part of the other horizontal air passage to the closed horizontal air passage through the ring-shaped passage above the horizontal air passage. As the result, it becomes possible to compress the bag smoothly by discharging the air of the bag effectively without preventing de-aeration almost. As mentioned in the item of claim 9, such function and advantage may be obtained by projecting a porous plate which is made of sponge or nonwoven fabric and the like having a predetermined thickness, from the outer peripheral end of the base plate of the valve body.

BRIEF DESCRIPTION OF THE DRAWINGS

The foregoing and other features of the invention will become more apparent from the description contained hereinbelow, taken in conjunction with the drawings, in which.

DETAILED DESCRIPTION OF THE PREFERRED EMBODIMENTS

Figure 1:
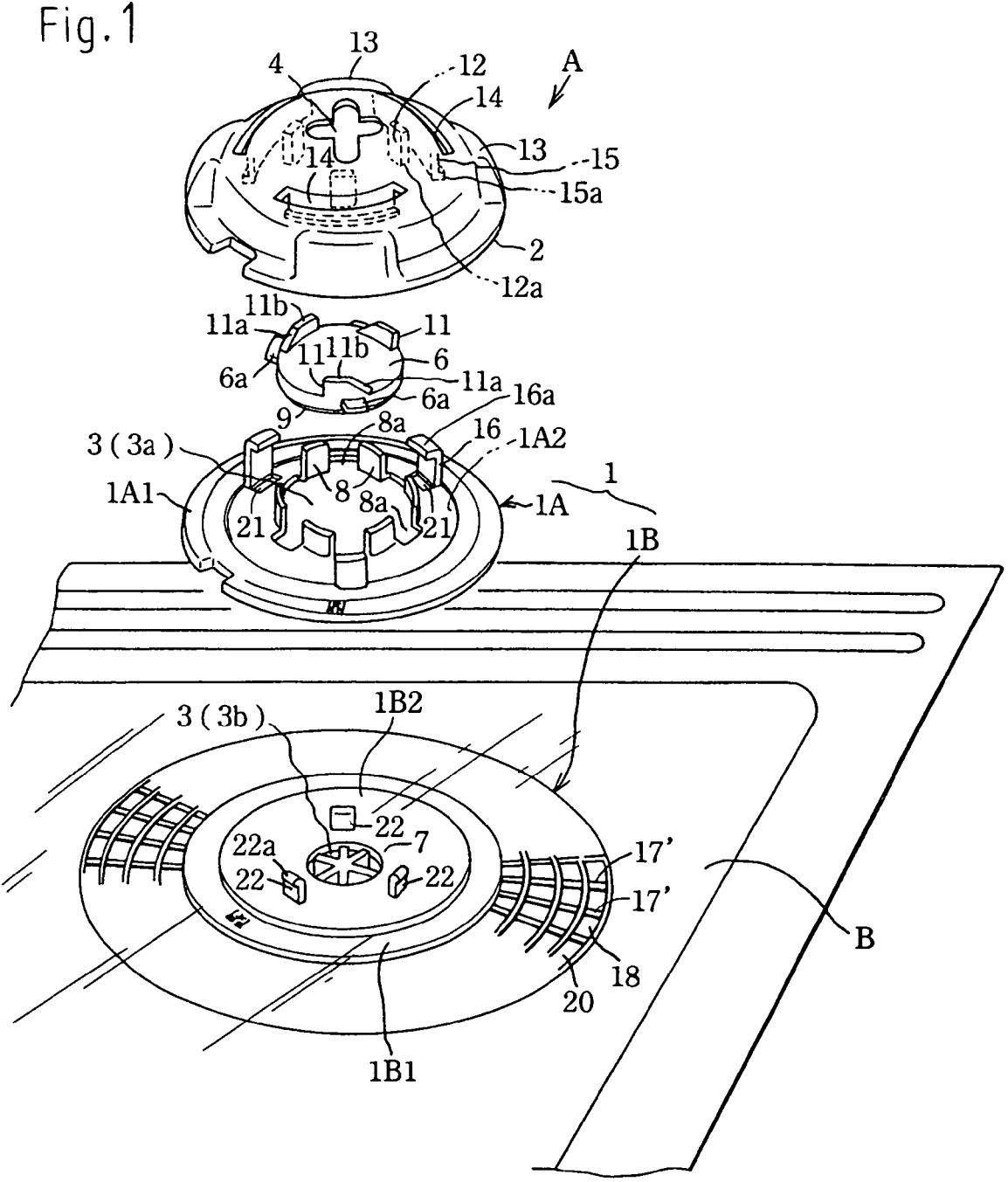
FIG. 1 is an exploded perspective view of an exhaust valve according to the present invention.
Figure 2:
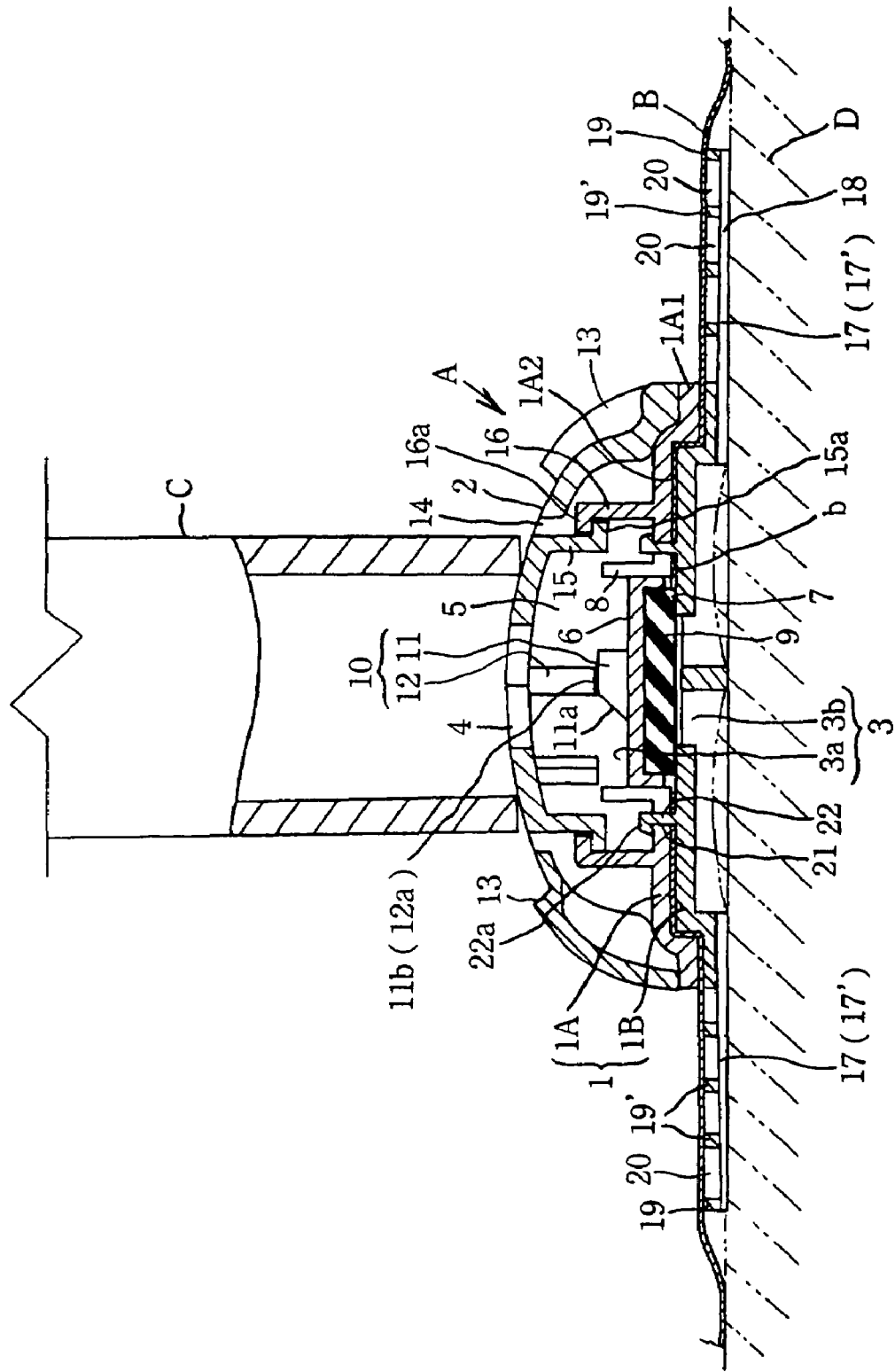
FIG. 2 is a vertical sectional view showing a state of mounting the exhaust valve onto a bag.
Figure 3:
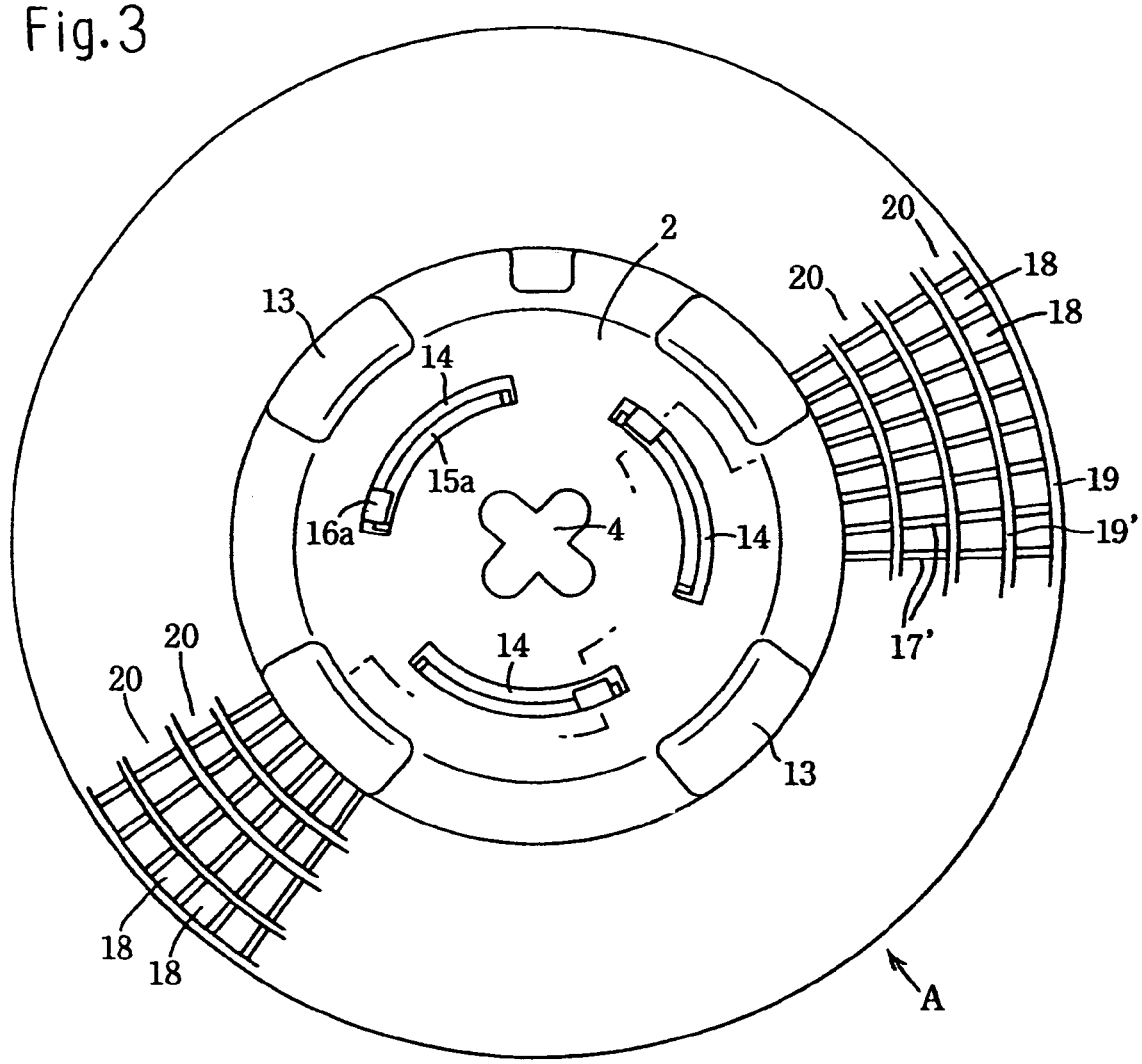
FIG. 3 is a fragmentary plan view of a portion of the valve.

Embodiments of the invention will be described hereinafter with reference to the drawings. In FIGS. 1 and 2, an exhaust valve A made of synthetic resin is fitted to a bag B by sandwiching or bonding a part of the bag B from the inside and the outside of the bag B with fusion. The exhaust valve A comprises a valve body 1, which is so structured that the air inside the bag B is removed by a suction force from the outside through an exhaust opening 3 provided in a central part of the valve body 1, and a lid body 2, which is fitted to the valve body 1 to freely turn in right and left directions, and has a suction opening 4 through upper and lower surfaces of the lid body in its central part. The space between the facing surfaces of the valve body 1 and the lid body 2 forms a suction exhaust chamber 5.

The valve body 1 comprises a disk-shaped valve-positioning member 1A having a diameter of about 6 cm and a disc-shaped base plate 1B. In the central part of the valve-positioning member 1A, an upper exhaust opening part 3$a$ of the exhaust opening 3 is formed to go through the upper and the lower surfaces of the valve-positioning member 1A. In the central part of the base plate 1B, a lower exhaust opening part 3$b$ of the exhaust opening 3 is formed to go through the upper and the lower surfaces of the base plate 1B. The lower exhaust opening part 3$b$ is formed to have a smaller diameter than that of the upper exhaust opening part 3$a$. In a state that the valve-positioning member 1A is laid on top of the base plate 1B to be integrated, a ring-shaped part, which is formed from the inner periphery of the upper exhaust opening part 3$a$ inwardly to the peripheral part of the lower exhaust opening part 3$b$, is exposed to form a valve seat 7 of a valve plate 6.

A structure for fitting the valve-positioning member 1A and the base plate 1B to the part of the bag B in a state of laying one on the other by sandwiching the part of the bag B from the inner and the outer surfaces will be described hereinafter. Locking openings 21 going through the upper and the lower surfaces of the valve-positioning member 1A are formed in three portions of the outer peripheral part of the exhaust opening part 3$a$ of the valve-positioning member 1A, and hook pieces 22 having a reverse L-shape in cross section are mounted to project at three portions of the outer peripheral parts of the exhaust opening 3$b$ of the base plate 1B. These hook pieces 22 are inserted into the opposite locking openings 21, respectively so that hook sections 22$a$ are locked into the upper end edges of the locking openings 21. An opening b communicating with the inner and the outer exhaust opening parts 3$a$, 3$b$ is formed in the bag B at its part for fitting the valve body 1.

Further, the outer peripheral part of the valve-positioning member 1A is formed to be a flange part 1A1, which is provided at a position lower than the central part of the valve-positioning member 1A by the thickness of the valve-positioning member 1A, and a circular-shaped recess portion 1A2 surrounded by the flange part 1A1 is formed on the lower surface side of the valve-positioning member 1A. In a similar manner, the outer peripheral part of the base plate 1B is also formed to be a flange part 1B1, which is provided at a position lower than the central part of the base plate 1B so that the circular-shaped central part 1B2 projecting upwardly from the flange part 1B1 may fit into the circular-shaped recess portion 1A2. Thus, the valve-positioning member 1A and the base plate 1B firmly sandwich the predetermined part of the bag B without shifting its position. Fitting of the valve-positioning member 1A and the base plate 1B to the inner and the outer surfaces of the bag B may be carried out by bonding the part of the bag B to the opposite valve-positioning member 1A and the base plate 1B by means of thermal fusion.

Furthermore, guide projection pieces 8 of a predetermined height are mounted to project upwardly on the peripheral edge of the upper exhaust opening part 3a at predetermined intervals in a peripheral direction. The valve plate 6 is positioned to be movable in a vertical direction inside a short cylindrical-shaped space surrounded by these guide projection pieces 8. Horizontal projections 6a are mounted to project on several places (three places in the drawing) of the outer peripheral edge of the valve plate 6. The horizontal projections 6a are inserted into interspaces 8a between the guide projection pieces 8, 8 adjacent to each other to slide freely in a vertical direction, so that the valve plate 6 may move accurately in a vertical direction without turning. A sealing material 9, which has a predetermined thickness and is elastically deformable under compression, is adhered to the lower surface of the valve plate 6 with an adhesive or the like.

The lower surface side of the lid body 2 is provided with a lock mechanism 10 which keeps the upper end of the exhaust opening 3 in a closed state by pressing the valve plate 6 downwardly when the lid body 2 is turned around the valve plate 6 in a direction of the periphery of the valve plate, and allows the valve plate 6 to move in a vertical direction when the lid body 2 is turned in the other direction.

The lock mechanism 10 comprises a plurality of cam projections 11, which are mounted to project upwardly on the upper surface of the outer peripheral edge of the valve plate 6 at predetermined intervals in the peripheral direction (three places in the drawing), and engaging projections 12, which are mounted to project downwardly on the lower surface of the outer peripheral part of the suction opening 4 in the lid body 2 at predetermined intervals (3 places in the drawing) in the peripheral direction thereof to face the upper parts of the cam projections 11, respectively. A half of the upper end surface of each of the cam projections 11 is gradually inclined upwardly and clockwise at an obtuse angle from an end thereof to form an inclined end surface 11a, and the other half is continued horizontally from the top end of inclination of the inclined end surface 11a to form a horizontal top surface 11b. The lower end surface of each of the engaging projections 12 is formed to be an locking end surface 12a, which is in slide contact with the inclined end surface 11a and the horizontal top surface 11b continuously.

When the locking end surfaces 12a of the engaging projections 12 come into contact with the inclined end surfaces 11a of the cam projections 11 and get onto the horizontal top surfaces 11b by rotation of the lid body 2 in a direction (clockwise), the valve plate 6 is locked so that it may not be released. When the locking end surfaces 12a of the engaging projections 12 leave the horizontal top surfaces 1b of the cam projections 11 through the inclined end surfaces 11a by rotation of the lid body 2 in the other direction (counterclockwise), the lock is released so that the valve plate 6 may move freely in a vertical direction. In the meantime, the cam projection 11 may be mounted to project on the side of the lid body 2, and the engaging projections 12 on the side of the valve plate 6.

Further, the lid body 2 is formed to be a dome-shape which is gently inclined from the peripheral edge of the suction opening 4, being formed in the central part of the lid body 2, downwardly to the outer peripheral edge of the lid body 2 to be a projecting arc shape. Restraining projections 13, 13 are mounted to project on several places (four places in the drawing) of the outer periphery of the upper surface of the lid body 2 at predetermined intervals in the peripheral direction so that a suction nozzle C of a vacuum cleaner which is to be in contact with the top surface of the lid body 2 is restrained from moving from the top surface of the lid body 2 to the outer periphery to an unnecessary extent.

Furthermore, outside-air intakes 14, 14, 14, which go through the upper and the lower surfaces of the lid body 2, are formed in several places (three places in the drawing) of the lid body between the restraining projections 13 and the suction opening 4. The outside-air intake 14 is formed to be a long opening, which curves to have an arc-shape having the suction opening 4 as its center. It is also formed to have a radius, namely, from the center of the intake opening 4 to the inner peripheral edge or to the midpoint of the width of the intake opening 4, which is generally the same with the outer diameter of the suction nozzle C. In other words, it is so structured that at least a part of the outside-air intake 14 may connect with the suction nozzle C, when the lower end of an opening of the suction nozzle C is placed on the valve body 1 to stand perpendicularly thereto by pressing it against the upper surface of the central part of the lid body 2.

On the lower surface side of the lid body 2, a locking projecting piece 15 having a predetermined length of projection and curving like an arc is mounted to project downwardly on the inner peripheral edge of each of the outside-air intakes 14. The locking projecting piece 15 is integrally provided with a locking projecting linear part 15a which projects outwardly from the lower end of the locking projecting piece 15. A connecting projecting piece 16 having a predetermined height is mounted to project upwardly at the outer peripheral edge of each of the locking openings 21, 21, 21 which are formed at three places on the outer peripheral edge part of the exhaust opening part 3a of the valve-positioning member 1A of the valve body 1. The connecting projecting piece 16 is integrally provided with a locking projecting part 16a which projects inwardly from the upper end of the connecting projecting piece 16 so that the valve body 1 and the lid body 2 may be integrally united and connected to each other by making the inward locking projecting part 16a of the connecting projecting piece 16 lock into the outward locking projecting linear part 15a of the locking projecting piece 15.

Figure 4:
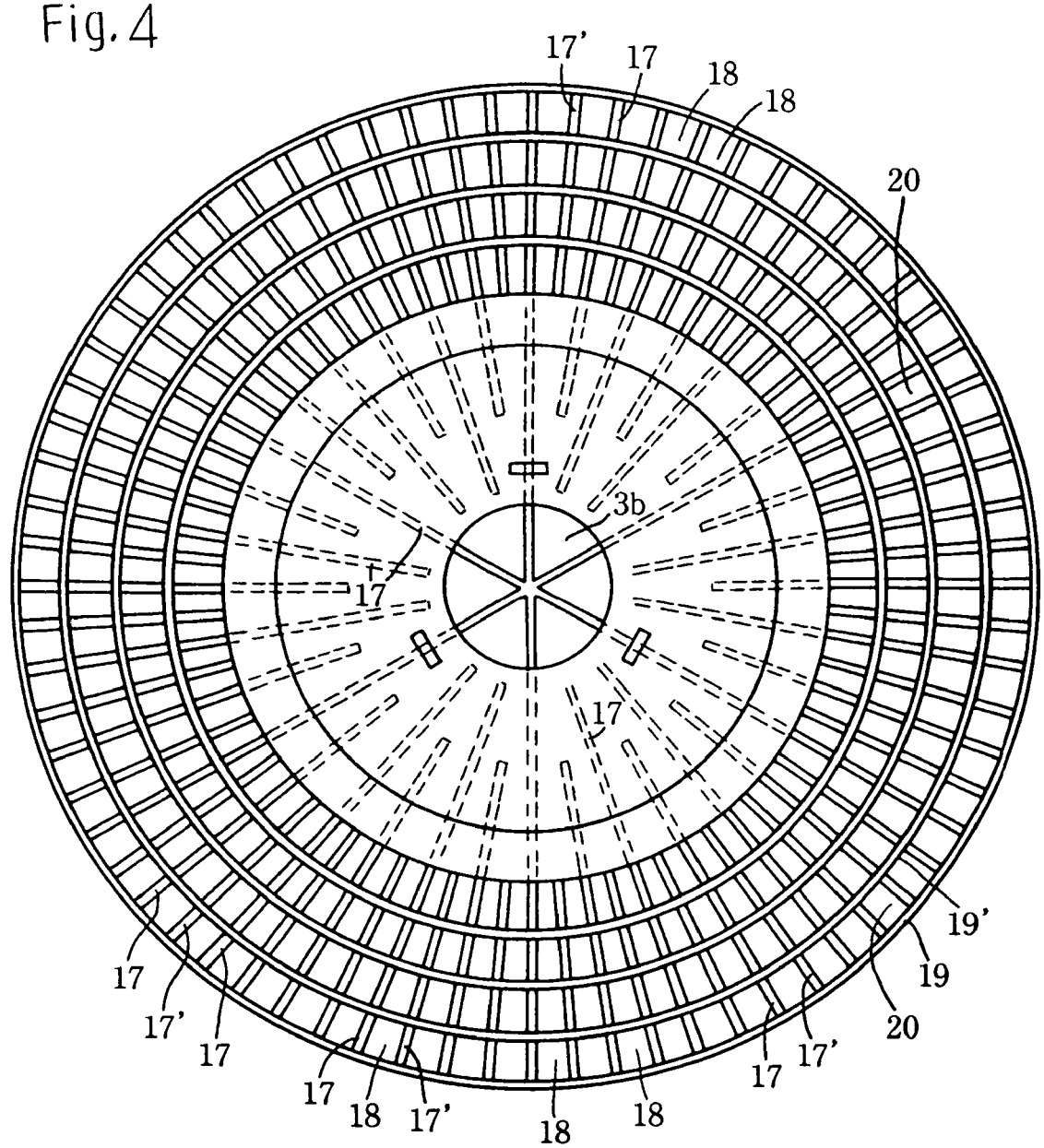
FIG. 4 is a plan view of a base plate of a valve body.

Further in the valve body 1, as shown in FIGS. 2 and 4, a plurality of horizontal linear bodies 17, 17, 17 having a predetermined height are mounted to project on the lower surface of the base plate 1B, which is to be fitted onto the inner surface of the bag B. The horizontal linear bodies 17, 17, etc. go radially from the peripheral edge of the lower end of the lower exhaust opening part 3b of the exhaust opening 3 formed in the central part of the base plate 1B to the outer peripheral edge of the base plate 1B. These horizontal linear bodies 17, 17, and etc., further project outwardly from the outer peripheral edge of the lower surface of the base plate 1B by a predetermined length. Furthermore, a horizontal linear body 17' projecting from the outer peripheral edge of the lower surface of the base plate 1B is laid between the adjacent horizontal linear bodies 17, 17 projecting from the outer peripheral edge of the base plate 1B to divide the interspaces between them into two, so that the space between the adjacent horizontal linear bodies 17, 17' may form horizontal air passages 18, 18, 18, etc. which connect with the lower end of the exhaust opening 3.

Ring-shaped linear bodies 19, 19' having large and small diameters and a predetermined height (generally the same height as the thickness of the base plate 1B) is mounted concentrically on the upper surface of the lot of horizontal linear bodies 17, 17', which radially project outwardly by a predetermined length of projection from the outer peripheral edge of the lower surface of the base plate 1B. The ring-shaped linear bodies 19, 19' connect the upper surfaces of all these horizontal linear bodies 17, 17' into a. The space between the adjacent ring-shaped linear bodies 19, 19' having large and small diameters forms ring-shaped air passages 20, 20, and the lower part of these ring-shaped air passages 20, 20 connect with all of the horizontal air passages 18, 18, and etc.

Next, a method of fitting the exhaust valve A, structured as mentioned above, to the bag B which is formed with a flexible sheet of synthetic resin to have a flat and rectangular shape, will be described hereinafter. As shown in FIGS. 1 and 2, the base plate 1B of the valve body 1 is fitted on the inner surface of the bag B so that the exhaust opening part 3b may connect with an opening b formed in an appropriate position of the bag B, and the bag B is pierced with the hook pieces 22 projecting from three places of the outer peripheral edge part of the exhaust opening part 3a to allow the hook pieces 22 project out of the bag B.

In this state, the valve-positioning member 1A of the valve body 1 is pressed from the outside of the bag B, and the hook pieces 22 are inserted into the locking openings 21 formed in three places of the outer peripheral edge part of the exhaust opening part 3a so that the hook sections 22a are locked into the upper end edge of the locking openings 21 and that a circular-shaped center part 1B2 of the base plate is fit into the circular-shaped recess portion 1A2 formed on the lower surface side of the valve-positioning member 1A. Thus, the valve-positioning member 1A and the base plate 1B are fitted to the predetermined part of the bag B in a state of sandwiching. In the meantime, the valve body 1 may fit to the bag B by bonding the valve-positioning member 1A and the base plate 1B to the bag B by means of fusion, as mentioned above.

After that, the lid body 2 is positioned on the valve-positioning member 1A of the valve body 1, and the lid body 2 is turned clockwise in a state that the locking projecting pieces 15, which are mounted to project downwardly on three places of the lower surface of the lid body 2, intervenes between the adjacent connecting projecting pieces 16, 16, which are mounted to project at three places of the outer peripheral edge of the exhaust opening part 3a of the valve-positioning member 1A, so that the locking projecting linear part 15a of each of the locking projecting pieces 15 may lock into the corresponding locking projecting part 16a and that the lid body 2 may be joined to the valve body 1. In the meantime, the lid body may be joined to the valve-positioning member 1A of the valve body 1 in advance, and then the valve-positioning member 1A may be joined to the base plate 1B.

Now, the method of having a content D in the bag B compressed by using the bag B provided with the exhaust valve A will be described. After the content D such as a comforter or the like is put into the bag B from its opening end, and a fastener comprising a linear projection part and a linear recessing part which are provided on the opposite inner surface of the opening end is closed from one end to the other end of the bag B to close the bag B air-tightly. By turning the lid body 2 of the exhaust valve A counterclockwise, the engaging projections 12 projecting from the lower surface of the lid body 2 is released from the cam projections 11 projecting from the upper surface of the valve plate 6, and the state of locking of the valve plate 6 is released to allow the valve plate 6 to move up and down.

After that, as shown in FIG. 2, the lower end of the opening of the suction nozzle C of the vacuum cleaner comes into contact with the upper surface of the lid body 2 of the exhaust valve A so that the suction opening 4 may connect with the suction nozzle C. On this occasion, because the upper surface of the lid body 2 is curved to form a dome-shape, the lower end of the opening of the suction nozzle C may be in full contact with the upper surface of the lid body 2 all over not only when the suction nozzle C is pressed against the valve body 1 in a perpendicular direction but also when it is pressed against it in an inclined position. In addition, even when the suction nozzle C is moved in right, left, front and rear directions under the state of pressing, all over the lower end of the opening may always be kept in contact with the upper surface of the lid body 2. Consequently, operational performance and convenience in handling are improved, and de-aeration of the bag B may be carried out smoothly. 1 in a perpendicular direction but also when it is pressed against it aslant. In addition, even when the suction nozzle C is moved in right, left, front and rear directions under the state of pressing, all over the lower end of the opening may always be kept in contact with the upper surface of the lid body 2. Consequently, operational performance and convenience in handling are improved, and de-aeration of the bag B may be carried out smoothly.

Further, because the restraining projections 13, which restrain the suction nozzle C from moving toward the outer peripheral edge of the lid body 2 to an unnecessary extent, project from the outer peripheral edge of the lid body 2, the lower end of the opening of the suction nozzle C is always and fully kept communicating with the suction opening 4 even when the suction nozzle C moves on the lid body 2 in right, left, front and rear directions.

Figure 5:
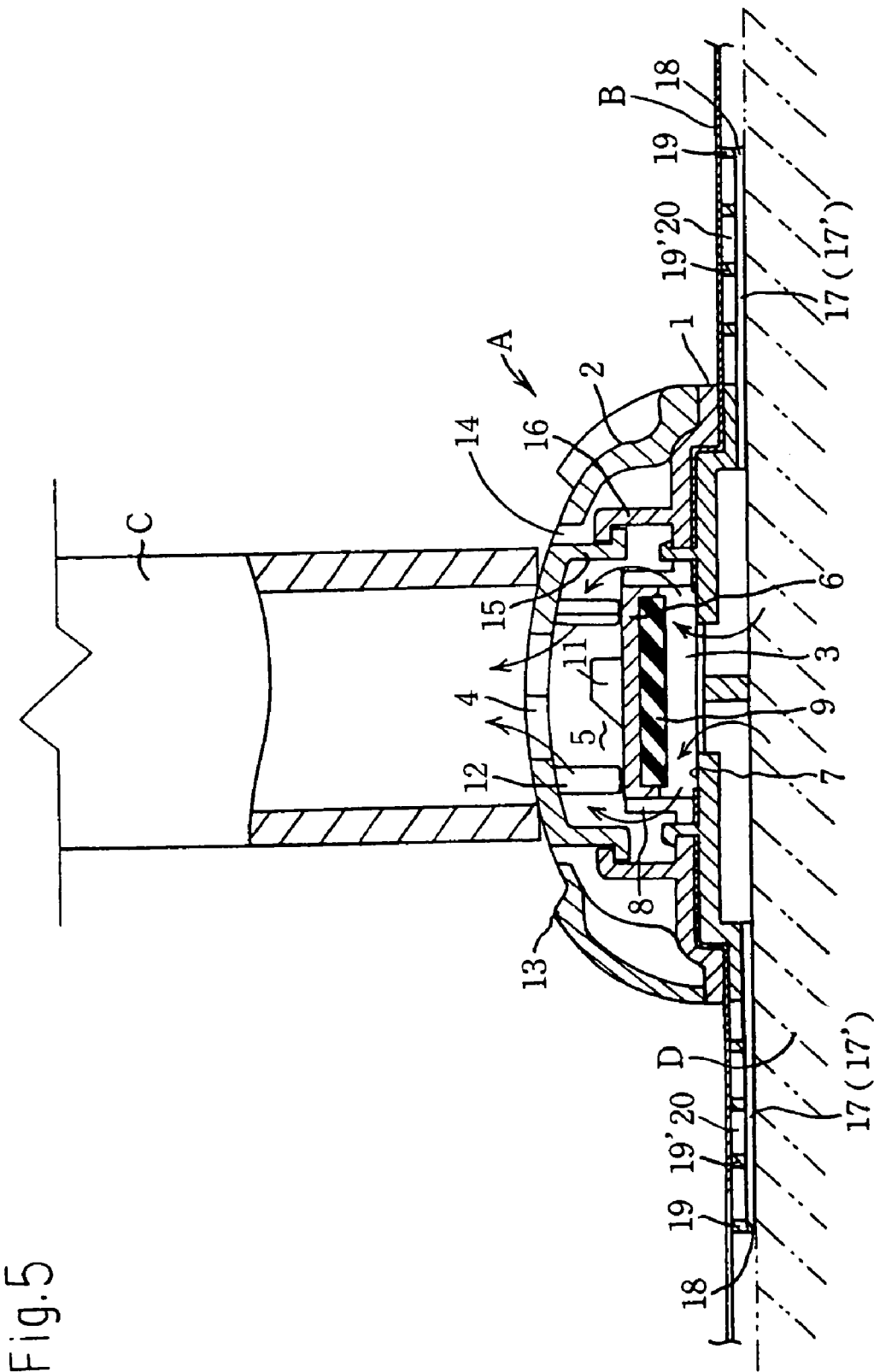
FIG. 5 is a vertical sectional view showing a state of de-aeration.

When the vacuum cleaner is operated while maintaining the state that the lower end of the opening of the suction nozzle C is kept in contact with the lid body 2 of the exhaust valve A to connect with the suction opening 4 in a manner as mentioned above, as shown in FIG. 5, suction force from the suction nozzle C works onto the inside of the suction exhaust chamber 5 through the suction opening 4 of the lid body 2, and further works from the suction exhaust chamber 5 onto the exhaust opening 3 to move the valve plate 6 up. Consequently, the exhaust opening 3 is opened so that the air inside the bag B is sucked and exhausted by the suction nozzle C from the exhaust opening 3 through the suction exhaust chamber 5 and the suction opening 4, so that the content D such as a comforter or the like is compressed to be flat.

Inside the bag B, because a plurality of horizontal linear bodies 17 are mounted on the lower surface of the base plate 1B of the valve body 1 to project outwardly from the outer peripheral edge of the lower end of the opening of the exhaust opening 3, and horizontal linear bodies 17' are further mounted to project radially from the outer peripheral edge of the lower surface of the base plate 1B together with the horizontal linear bodies 17, these horizontal linear bodies 17, 17' projecting from the base plate 1B intervene between the inner surface of the bag B separated from the content D to keep the inner surface of the bag B and the content D over a wide area. In addition, the suction force from the exhaust opening 3 spread outwardly from the exhaust opening 3 through a plurality of horizontal air passages 18 existing between the adjacent horizontal linear bodies 17,17'. Consequently, the suction force from the exhaust opening 3 works on the inside of the bag B and the content D to exhaust the air in the bag B smoothly and efficiently through a wide circular area having a radius ranging from the exhaust opening to the tips of the horizontal linear bodies 17, 17' even when the content D is a down-filled quilt which has less air permeability.

Further, because the space between the adjacent ring-shaped linear bodies 19, 19' having large and small diameters are formed to be ring-shaped air passages 20, 20 by mounting the ring-shaped linear bodies 19, 19' concentrically on the upper surface of the plurality of horizontal linear bodies 17, 17', which radially project outwardly from the outer peripheral edge of the lower surface of the base plate 1B, even when the content D is sucked into the horizontal air passage 18 by the suction force therein and the horizontal air passage 18 is closed, the suction force existing in the other horizontal air passages 18 detours to go above the closed horizontal air passage through the ring-shaped air passage 20 above the horizontal air passage 18 to de-aerate the content D which is sucked into the horizontal air passage 18. As a result, the air inside the bag B may be exhausted efficiently without imposing excessive load on a motor of the vacuum cleaner.

In addition, during the de-aeration work of the inside of the bag B, the suction force of the suction nozzle C also works on the outside-air intake 14 formed in the lid body 2 through the suction exhaust chamber 5. As a result, the outside air is taken into the suction nozzle C from the outside-air intake 14 through the suction exhaust chamber 5 and the suction opening 4 together with the air inside the bag B. After the de-aeration of the inside of the bag B is carried out completely, suction of the outside air from the outside-air intake 14 continues. Therefore, de-aeration of the inside of the bag B may be carried out with little load on the motor of the vacuum cleaner.

When the suction opening of the suction nozzle C is separated from the lid body 2 of the exhaust valve A after the de-aeration of inside of the bag is carried out as mentioned above, suction force of the vacuumed bag B works on the exhaust opening 3 and the valve plate 6 is immediately fitted onto the valve seat 7 under pressure to prevent the outside air from entering into the bag B. In the meantime, the outside-air intake 14 may be formed outside of the restraining projection 13.

After that, when the lid body 2 is turned clockwise, the locking end surfaces 12a of the engaging projections 12 mounted to project on the lower surface of the lid body 2 come into contact with the inclined end surfaces 11a of the cam projections 11 projecting upwardly from the outer peripheral edge of the valve plate 6, and then the locking end surfaces 12a get onto the horizontal top surface 11b of the cam projections 11 while sliding on the inclined end surfaces 11a, so that the exhaust opening 3 is locked to be in a closed state by having the sealing material 9 of the valve plate 6 pressed against the valve seat 7 in a compressed state. In the meantime, under the state of locking, even when the lid body 2 is turned, the valve plate 6 is locked firmly without turning because the horizontal projections 6a projecting from several places of the outer peripheral edge of the valve plate 6 are respectively inserted into the interspaces between the adjacent guide projection pieces 8, 8 projecting around the exhaust opening 3.

Figure 6:
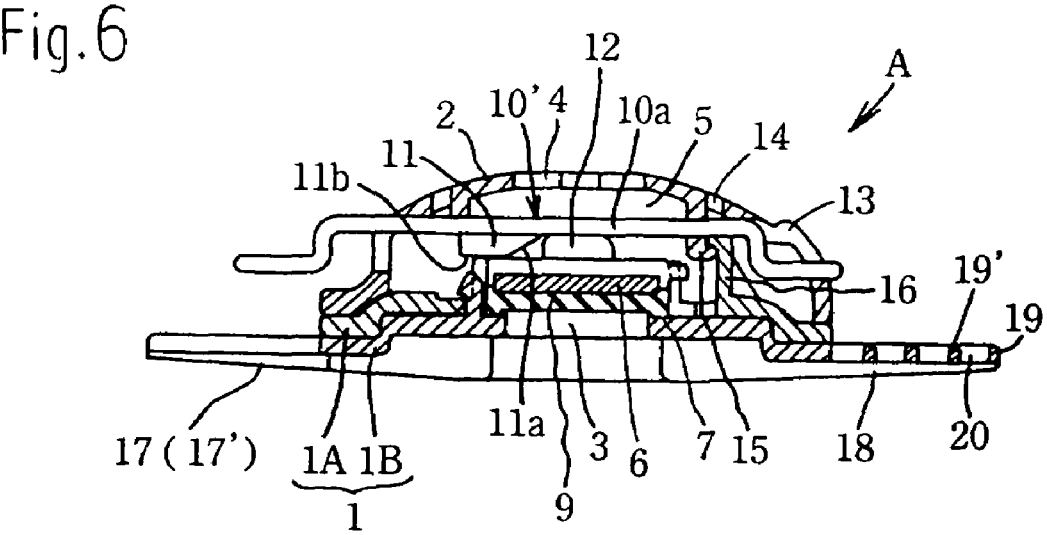
FIG. 6 is a vertical sectional view of an exhaust valve showing another embodiment of the invention.
Figure 7:
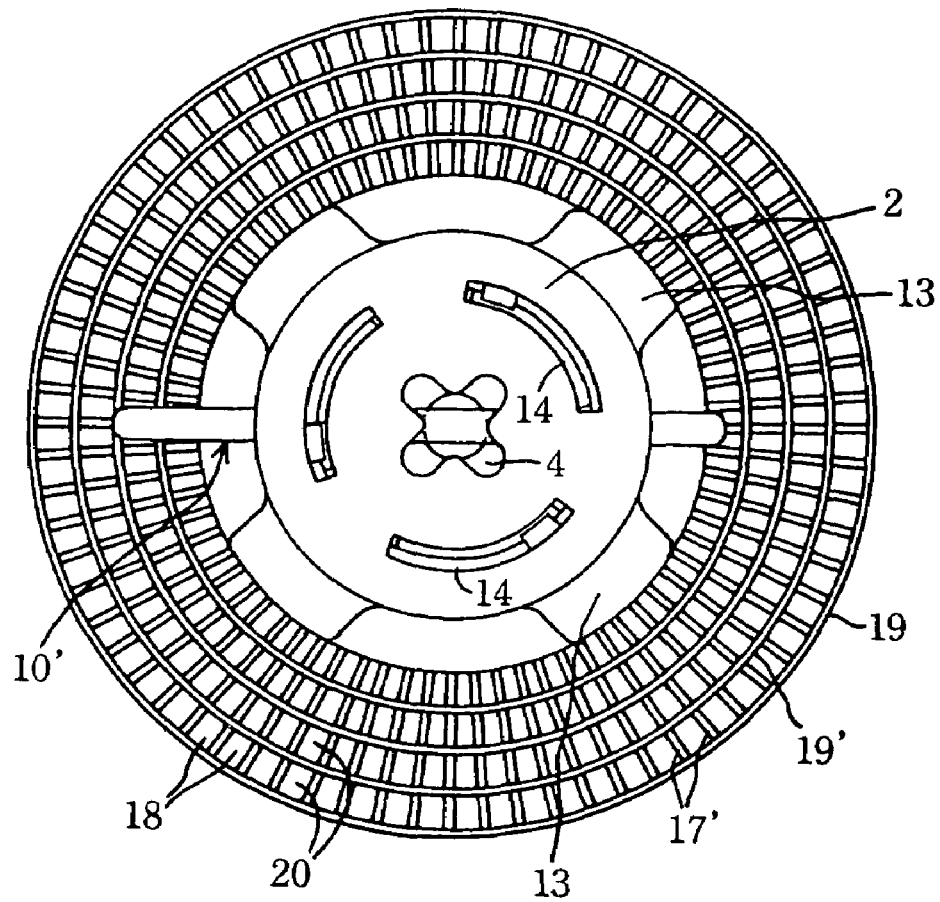
FIG. 7 is a plan view of the exhaust valve of another embodiment.

FIGS. 6 and 7 show another embodiment of the invention. In the above-mentioned embodiment, the lock mechanism 10 of the valve plate 6 comprises a plurality of cam projections 11, which are mounted to project on the outer peripheral edge of the upper surface of the valve plate 6 at predetermined intervals in a peripheral direction, and engaging projections 12 which are mounted to project on the lower surface of the lid body 2 at the outer peripheral part of the suction opening 4. The engaging projections 12 are locked onto the upper surface of the opposite cam projections 11, respectively, by turning the lid body 2 in a direction so that the valve plate 6 is kept to be in a closed state, and the state of locking of the engaging projections 12 to the upper surface of the opposite cam projections 11 is released by turning the lid body 2 in the other direction to allow the valve plate 6 to move in up and down directions. In the embodiment shown in FIGS. 6 and 7, a lock mechanism 10' of the valve plate 6 is structured such that an operation member 10a, which is movable in reciprocal motion in a horizontal direction, is mounted to the lid body so that locking may be carried out by moving the operation member 10a back and forth.

To be specific, the lock mechanism 10' comprises a bar-shaped operation member 10a which goes through and supports the lid body 2 to be movable in a back-and-forth motion in a horizontal direction, the cam projections 11 having inclined end surfaces 11a and horizontal top surfaces 11b, which cam projection 11 is mounted to project downwardly on the lower surface of a lengthwise central part of the operation member 10a, and engaging projections 12 mounted to project on the central part of the upper surface of the valve body 6 to face the inclined end surfaces 11a of the cam projections 11, respectively, so that the engaging projections 12 may lock into or separate from the cam projections 11.

Both ends of the operation member 10a projecting from the lid body 2 are held and the operation member 10a is moved in a forward horizontal direction so that the inclined end surfaces 11a and then the horizontal top surfaces 11b of the cam projections 11 may get on the engaging projections 12, respectively. Thus the valve plate 6 is pressed downwardly so that the sealing material 9 may be pressed against the valve seat 7 in a compressed state and the exhaust opening 3 may be locked in a closed state. When the operation member 10a is moved in a backward horizontal direction, the cam projections 11 separate from the engaging projections 12 so that the state of locking of the valve plate 6 may be released. In the meantime, the engaging projections 12 may be mounted on the operation member 10a and the cam projections 11 on the valve plate 1. Because the structure is otherwise the same as the above-mentioned embodiment, the same code is appended to the same part and detailed explanation is left out.

In any of the above-mentioned embodiments, the horizontal air passages 18 are formed with a large number of horizontal linear bodies 17, 17' projecting radially from the outer peripheral edge of the lower surface of the base plate 1B of the valve body 1. Further, the ring-shaped linear bodies 19, 19' having large and small diameters are concentrically mounted on the upper surfaces of the horizontal linear bodies 17, 17' so that the interspaces between the adjacent ring-shaped linear bodies 19, 19' may form the ring-shaped air passages 20, 20. Thus, the suction force is applied to a wide area of the inside of the bag B so that efficient de-aeration may be achieved. Instead of forming the air passages by using these horizontal linear bodies 17, 17' and the ring-shaped linear bodies 19, 19', the same operation and effect as above-mentioned may be obtained by using a ring-shaped porous plate, which is made of sponge or non-woven fabric having a predetermined thickness, is mounted to project outwardly on the outer peripheral edge of the base plate 1B of the valve body 1, because innumerable openings connect with a another in a direction of its thickness and in a horizontal direction.

The foregoing relates to preferred exemplary embodiments of the invention, it being understood that other variants and embodiments thereof are possible within the spirit and scope of the invention, the latter being defined by the appended claims.

We claim:

1. An exhaust valve for a bag comprising;
a valve body adapted to be fitted to the bag by sandwiching or bonding a part of the bag from inner and outer surfaces of the bag with fusion, a center part of the valve body having an exhaust opening for communicating with an opening between the inner and the outer surfaces of the bag,
a lid body detachably fitted to the valve body, said lid body having a suction opening in a central part thereof,
a valve plate arranged above an upper end of the exhaust opening to move up and open the exhaust opening at the time of exhaust of the bag and to move down and close the exhaust opening after aeration of the bag, and
a lock mechanism arranged on a lower surface of the lid body to keep the exhaust opening closed by pressing the valve plate downwardly when the lid body is turned in one direction around the valve plate and to allow the valve plate to move up and down when the lid body is turned in another direction,
wherein the lock mechanism comprises a plurality of cam projections mounted to project on an upper surface of an outer peripheral edge of the valve plate at predetermined intervals in a peripheral direction, and engaging projections mounted to project on an outer peripheral part of the suction opening in the lower surface of the lid body, whereby the engaging projections are engaged with an upper end surface of the cam projections by a turning operation of the lid body in a direction so as to keep the valve plate closed, and the engaging projections are disengaged with the upper end surface of the cam projections by a turning operation of the lid body in another direction so as to allow the valve plate to move up and down.

2. An exhaust valve for a bag comprising
a valve body adapted to be fitted to the bag by sandwiching or fusion-bonding a part of the bag from inside and outside of the bag, a center part of the valve body having an exhaust opening for communicating with inner and outer surfaces of the bag,
a lid body detachably fitted to the valve body and having a suction opening in a central part thereof,
a valve plate arranged above an upper end of the exhaust opening to move up and open the exhaust opening at the time of exhaust of the bag and to move down and close the exhaust opening after aeration of the bag,
wherein the valve body comprises a disc-shaped valve-positioning member having an upper exhaust opening part at its central part and a disc-shaped base plate having a lower exhaust opening part at its central part, the valve-positioning member and the base plate being adapted to sandwich or bond a part of the bag from the inner and the outer surfaces of the bag with fusion so as to be unified together, and
a plurality of horizontal linear bodies are mounted to project outwardly on a peripheral edge of a lower end opening of the exhaust opening of a lower surface of the base plate so that horizontal passages communicating with the exhaust opening may be formed by interstices between adjacent horizontal linear bodies, and further ring-shaped linear bodies having large and small diameters are concentrically mounted on an upper surface of the horizontal linear bodies projecting outwardly from the base plate so that ring-shaped passages are formed between adjacent ring-shaped linear bodies having large and small diameters.

* * * * *